United States Patent
Passaniti et al.

(10) Patent No.: US 12,441,324 B2
(45) Date of Patent: Oct. 14, 2025

(54) DEVICE AND METHOD FOR AUTOMATIC DETECTION OF ROAD CONDITIONS FOR VEHICLE APPLICATIONS

(71) Applicant: STMicroelectronics S.r.l., Agrate Brianza (IT)

(72) Inventors: Fabio Passaniti, Syracuse (IT); Enrico Rosario Alessi, Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 353 days.

(21) Appl. No.: 17/871,463

(22) Filed: Jul. 22, 2022

(65) Prior Publication Data
US 2023/0045861 A1    Feb. 16, 2023

(30) Foreign Application Priority Data
Aug. 10, 2021    (IT) .................. 102021000021680

(51) Int. Cl.
*B60W 40/06* (2012.01)
*B60W 40/105* (2012.01)
(Continued)

(52) U.S. Cl.
CPC .......... *B60W 40/06* (2013.01); *B60W 40/105* (2013.01); *G01R 29/12* (2013.01); *G01R 29/24* (2013.01)

(58) Field of Classification Search
CPC ..... B60W 40/06; B60W 40/105; G01R 29/12; G01R 29/24; B60T 2210/12; B60T 8/172
See application file for complete search history.

(56) References Cited

U.S. PATENT DOCUMENTS 9,925,988 B1    3/2018    Zwicky et al.
2004/0138831 A1 *  7/2004    Watanabe ............. B60T 8/1725
                                                 702/33

(Continued)

FOREIGN PATENT DOCUMENTS

DE    102019207157 A1    11/2020
EP    2801835 A1    11/2014
(Continued)

OTHER PUBLICATIONS

Abdic et al., "Detecting Road Surface Wetness from Audio: A Deep Learning Approach," *2016 23rd International Conference on Pattern Recognition (ICPR)*, Cancun, Mexico, Dec. 4-8, 2016, IEEE, pp. 1-5.

Askari et al., "Tire Condition Monitoring and Intelligent Tires Using Nanogenerators Based on Piezoelectric, Electromagnetic, and Triboelectric Effects," *Advanced Materials Technologies 4*, 19 pages, Aug. 2018.

(Continued)

*Primary Examiner* — Ig T An
(74) *Attorney, Agent, or Firm* — Seed IP Law Group LLP

(57) ABSTRACT

A road condition detection device, to be coupled to the wheel of a vehicle, is provided with: an electrostatic charge variation sensor, to provide a charge variation signal indicative of an electrostatic charge variation associated with the rotation of the wheel; and a processing unit, coupled to the electrostatic charge variation sensor to receive the charge variation signal and furthermore for receiving a rotation speed signal indicative of the rotation speed of the wheel. In particular, the processing unit jointly processes the rotation speed signal and the charge variation signal to detect a road condition of a wet road condition and a dry road condition.

18 Claims, 6 Drawing Sheets

(51) Int. Cl.
*G01R 29/12* (2006.01)
*G01R 29/24* (2006.01)

(56) References Cited

U.S. PATENT DOCUMENTS

| | | |
|---|---|---|
| 2005/0085987 A1* | 4/2005 | Yokota ............... B60C 23/0477 73/146 |
| 2006/0265114 A1 | 11/2006 | Thumrugoti |
| 2014/0232516 A1 | 8/2014 | Stivoric et al. |
| 2014/0350879 A1* | 11/2014 | Takiguchi ............... B60T 8/172 702/70 |
| 2016/0342781 A1 | 11/2016 | Jeon |
| 2019/0185008 A1 | 6/2019 | Kanbayashi et al. |
| 2021/0232227 A1 | 7/2021 | Passaniti et al. |

FOREIGN PATENT DOCUMENTS

| | | |
|---|---|---|
| EP | 2980609 A1 | 2/2016 |
| JP | 2007314025 A | 12/2007 |
| JP | 2013151272 A | 8/2013 |
| KR | 20110061750 A | 6/2011 |

OTHER PUBLICATIONS

Häkli et al., "Road surface condition detection using 24 GHz automotive radar technology," *2013 14th International Radar Symposium (IRS)*, Dresden, Germany, Jun. 19-21, 2013, IEEE. (7 pages).

Sabanovic et al., "Identification of Road-Surface Type Using Deep Neural Networks for Friction Coefficient Estimation," *Sensors* 20(612): 1-17, Jan. 2020.

* cited by examiner

DEVICE AND METHOD FOR AUTOMATIC DETECTION OF ROAD CONDITIONS FOR VEHICLE APPLICATIONS

BACKGROUND

Technical Field

The present solution relates to a device and a method for automatic detection of road conditions for vehicle applications, in particular for autonomous or automated driving.

Description of the Related Art

As is known, road vehicles are commonly provided with a plurality of sensors, in order to increase their safety and also in order to implement autonomous or automated driving.

In this regard, the monitoring and detection of road conditions and consequent forces generated on the vehicle tires/wheels are, for example, crucial to ensure safety and reliability.

In particular, the detection of road conditions (for example, distinguishing between a dry or wet road) may enable to significantly improve the intervention modes of important vehicle systems, such as the braking system, the steering or the active suspensions. Furthermore, the possibility of signaling and warning a driver as to road conditions may significantly improve driving safety.

In general, two approaches have been proposed for monitoring road conditions:
- a first approach, based on the effects, provides for the identification of road friction conditions, in an indirect manner, by estimating the response of dynamic parameters of the vehicle;
- a second approach, based on causes, provides for the detection of the causes, that is, in a direct manner, of the actual variation of road conditions, before they significantly affect the behavior of the vehicle, using various sensors suitable for this purpose.

For example, as to the second approach, J. Häkli et al., "Road surface condition detection using 24 GHz automotive radar technology," 14th International Radar Symposium (IRS), 2013, pp. 702-707, discloses measurement systems using a 24-GHz radar technology to study the backscattering properties of different asphalt surfaces, such as dry, wet or icy surfaces.

I. Abdić et al., "Detecting road surface wetness from audio: A deep learning approach," 23rd International Conference on Pattern Recognition (ICPR), 2016, pp. 3458-3463, discloses a method for detecting the humidity of the road surface, based on the processing of sound signals generated by the interaction between the same surface and the tire.

E. Šabanovič, et al. "Identification of Road-Surface Type Using Deep Neural Networks for Friction Coefficient Estimation," Sensors 2020, 20, no. 3, 612, discloses a solution for detecting the type of road surface based on the acquisition of images and their processing through the use of DNN (Deep Neural Network) neural networks.

The present Applicant has found that the solutions currently used have, however, some limitations and suffer from some drawbacks, in general as to the applicability to various operating conditions, the reliability and robustness to external and unwanted factors, the life and reliability of the used sensors.

BRIEF SUMMARY

The present solution is directed to overcoming the drawbacks of the known approaches, providing a solution for detecting road conditions, having improved characteristics.

According to the present solution, a device and a method for the detection of road conditions are provided. A road condition detection device is coupled to a wheel of a vehicle and includes an electrostatic charge variation sensor, configured to provide a charge variation signal indicative of an electrostatic charge variation associated with rotation of the wheel and a processing unit, coupled to the electrostatic charge variation sensor and configured to receive the charge variation signal and further configured to receive a rotation speed signal indicative of the rotation speed of said wheel. The processing unit is configured to jointly process said rotation speed signal and charge variation signal for detecting a road condition between a wet condition and a dry condition in response to an amplitude of the charge variation signal and the rotation speed signal.

BRIEF DESCRIPTION OF THE SEVERAL VIEWS OF THE DRAWINGS

For a better understanding of the disclosure, embodiments thereof are now described, purely by way of non-limiting example and with reference to the attached drawings, wherein.

DETAILED DESCRIPTION

Figure 1:
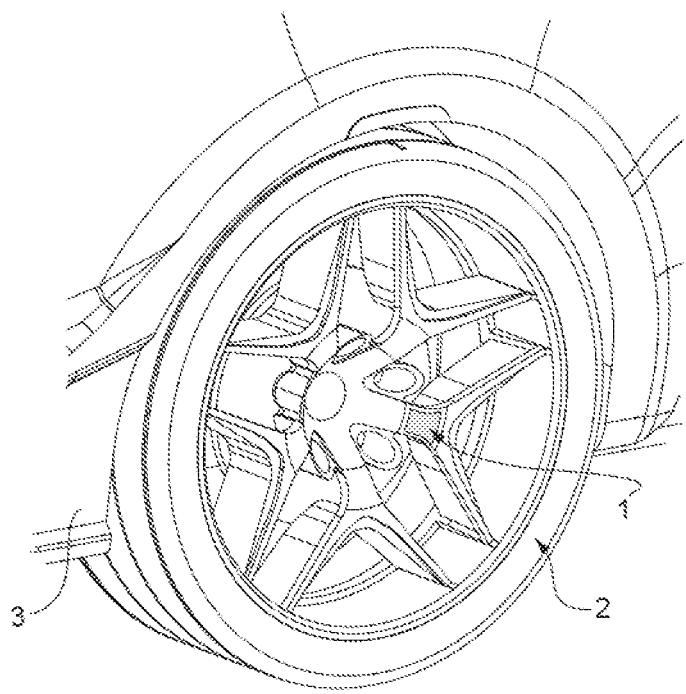
FIG. 1 is a schematic representation of a road condition detection device, coupled to the wheel of a vehicle.

As shown schematically in FIG. 1, according to an aspect of the present solution, detection of road conditions for vehicle applications is provided by a detection device 1, designed to be integrally coupled to a wheel 2 of a vehicle 3 and based on the use of an electrostatic charge variation sensor.

The detection device 1 may for example be coupled to the rim of the wheel 2, in proximity to the tire, or be coupled to the tire, or be integrated inside the rim or tire.

As will be discussed in detail below, the detection device 1 is configured so that a charge variation signal provided by the electrostatic charge variation sensor is processed jointly, or in combination, with information on the rotation speed of the wheel, in order to identify road conditions, in particular to distinguish between a dry road condition and a wet road condition.

In a per se known manner, the electric charge is a fundamental component of nature. The charge of an electrostatically charged body may be easily transferred to another body, in conditions of direct contact between the elements or at a distance. When the charge is transferred between two electrically insulated objects, a static charge is generated whereby the object with an excess of electrons is charged negatively and the object with a deficit of electrons is charged positively. The displacement of charges is of a different nature, depending on whether the object is a conductive object or a dielectric. In a conductor, the electrons are distributed throughout the material and are free to move, based on the influence of external electric fields. In a dielectric, there are no electrons free to move but electric dipoles, with random directions in space (thus resulting in zero net charge), which may be oriented or deformed through an external electric field, thus generating an ordered charge distribution and, therefore, a bias. The charge may be movable, depending on material properties and other environmental factors.

In the present solution, the electrostatic charge variation sensor of the detection device 1 is configured to detect, through electrostatic induction, the variations in the electric field (and therefore in electrostatic potential), which occur over time due to the local electrostatic charge variation, caused by the rotation of the wheel 2 of the vehicle 3, to which the same sensor is coupled.

In particular, when, during its rotation, the portion of the wheel 2, at which the charge variation sensor is coupled, comes into contact with the road surface (in particular, asphalt), an electrostatic charge generation (due to triboelectric effect) occurs, with a consequent evident modification in the charge variation signal provided by the charge variation sensor.

Figure 2A:
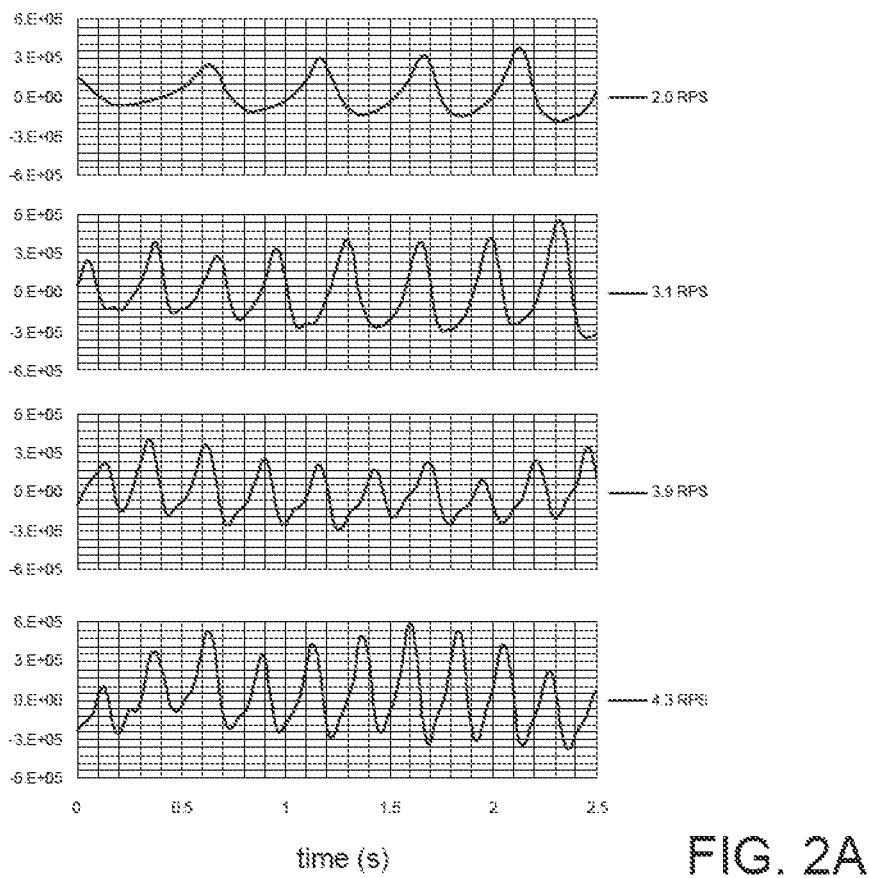
FIGS. 2A and 2B show trends, respectively in the time and frequency domain, of a charge variation signal, in a first road condition, of a dry road.

In this regard, FIG. 2A shows the trend in the time domain $S_Q(t)$ of the charge variation signal $S_Q$ indicative of the electrostatic charge variation felt by the charge variation sensor, at different rotation speeds (indicated as RPS, rotations or revolutions per second) of the wheel 2 having the detection device 1 coupled thereto.

In particular, it is evident that, corresponding to the rotations of the wheel 2 (that occur at a shorter period, i.e., at a higher angular frequency, the greater the rotation speed), peaks are generated in the charge variation signal $S_Q$, due to the aforementioned electrostatic charge generation effect caused by the contact between the tire and the road.

Figure 2B:
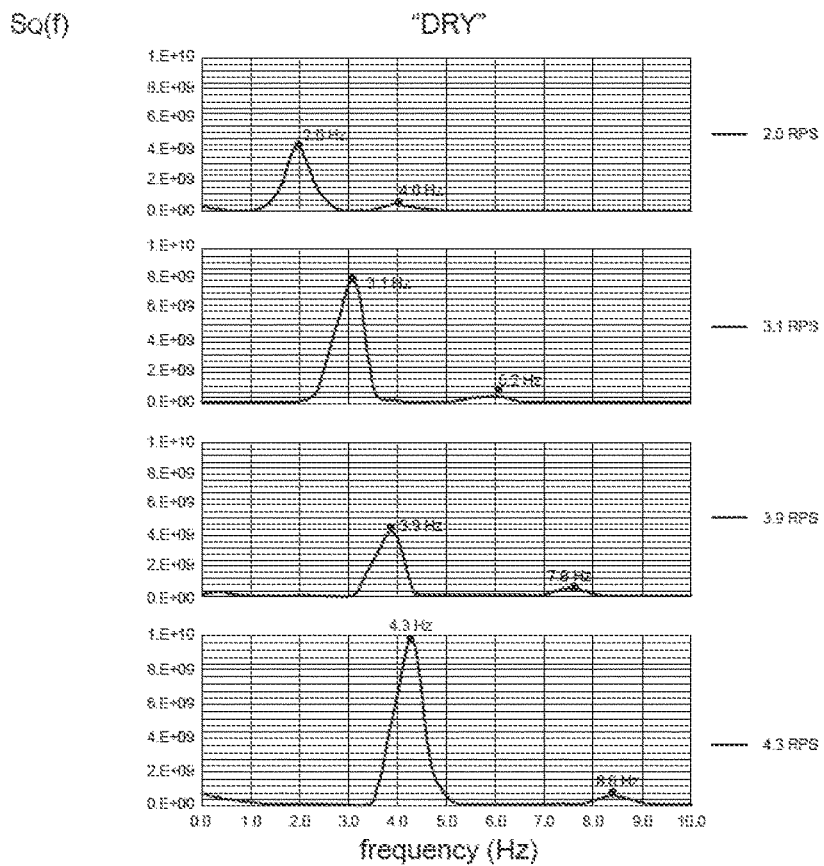

FIG. 2B shows the corresponding trend in the frequency domain $S_Q(f)$ of the same charge variation signal $S_Q$, again considering the different rotation speeds of the wheel 2.

In the frequency spectrum of the charge variation signal $S_Q$ various harmonics of the rotation frequency of the wheel are present; in particular, the frequency of the main or fundamental harmonic has a value corresponding to the inverse of the rotation period of the wheel 2, i.e., to its rotation speed (indicated in RPS, revolutions per second) and has a significantly greater amplitude; further harmonics are present at multiples of the main harmonic frequency.

The present Applicant has found that the amplitude of the aforementioned charge variation signal $S_Q$ is strongly influenced by (and therefore indicative of) the road conditions. In particular, in the presence of water (of a so-called "aqueous film") on the road surface, this amplitude is significantly lower, due to the fact that electrostatic charge generation due to the triboelectric effect (i.e., due to the rubbing of the tire on the road) is significantly reduced (the wet road condition neutralizing this effect to a significant extent).

Figure 3A:
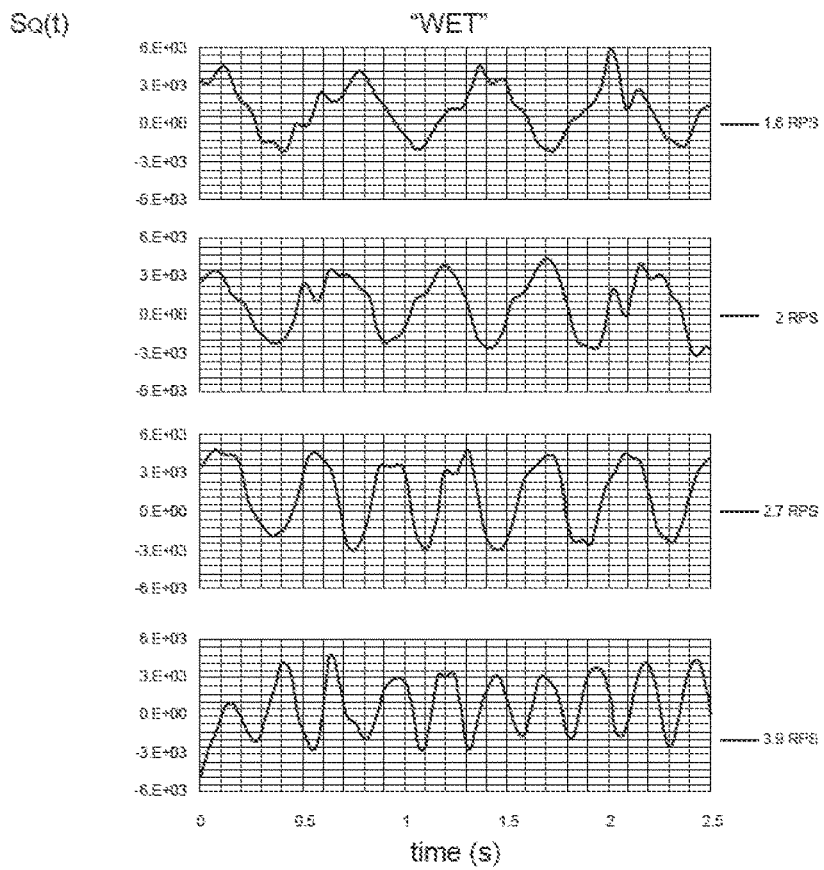
FIGS. 3A and 3B show trends, respectively in the time and in frequency domain, of the charge variation signal, in a second road condition, of a wet road.
Figure 3B:
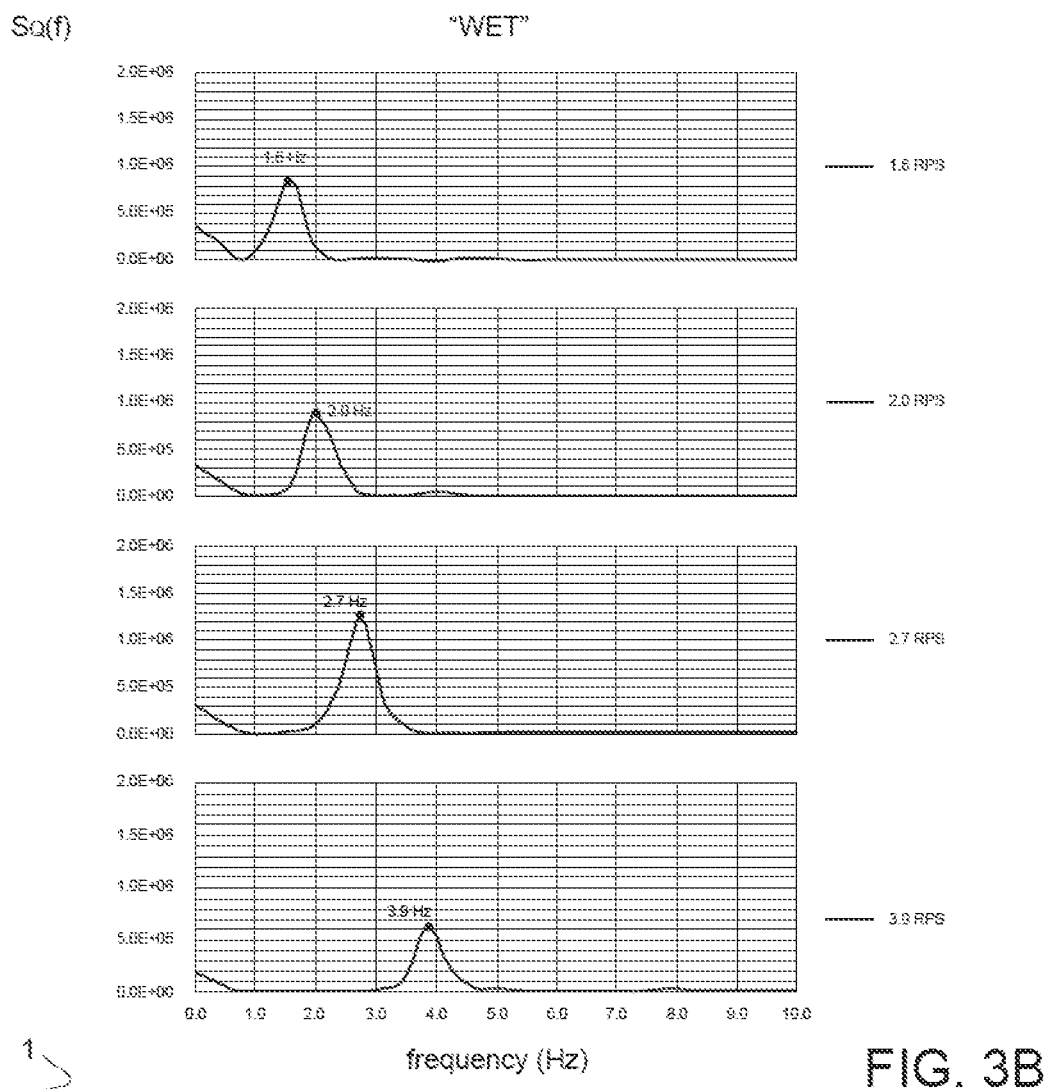

In this regard, FIGS. 3A and 3B show, similarly to what has been shown in FIGS. 2A and 2B (the latter being related to a dry road condition, "dry"), the trend in the time domain $S_Q(t)$ and the trend in the frequency domain $S_Q(f)$ of the charge variation signal $S_Q$, at different rotation speeds of the wheel 2 (two of the rotation values corresponding to values shown in the aforementioned FIGS. 2A and 2B), in a wet road condition, "wet."

From the comparative examination of these FIGS. 3A and 3B and of the preceding FIGS. 2A and 2B, the marked reduction in the amplitude of the charge variation signal $S_Q$ is apparent, in particular in the amplitude of the fundamental harmonic of the signal in the frequency domain, an amplitude which is therefore strongly linked to the asphalt conditions: in particular, a maximum amplitude corresponds to a dry road and a minimum amplitude (i.e., significantly less with respect to the dry road condition) corresponds to a wet road (having a film or aqueous layer thereon).

In detail, the present Applicant has found an average reduction in the amplitude of the charge variation signal $S_Q$, considered in the time domain, by a factor of about 100; and a corresponding average reduction in the charge variation signal $S_Q$, considered in the frequency domain, by a factor equal to about 5000.

An aspect of the present solution thus provides for the joint or combined processing of the charge variation signal $S_Q$, in particular considered in the frequency domain (where a more marked reduction in the aforementioned amplitude occurs), and of a signal indicative of the rotation speed of the wheel 2, which is used to identify the fundamental (and most significant) harmonic of the same charge variation signal $S_Q$.

As will be highlighted, according to an aspect of the present solution, this rotation speed variation signal is also used to inhibit the detection of road conditions at reduced rotation speeds of the wheel 2, since the present Applicant has found that, for reduced speeds, the aforementioned electrostatic charge generation associated with the rotation of the wheel 2 may not be significant and therefore not provide reliable indications.

Figure 4:
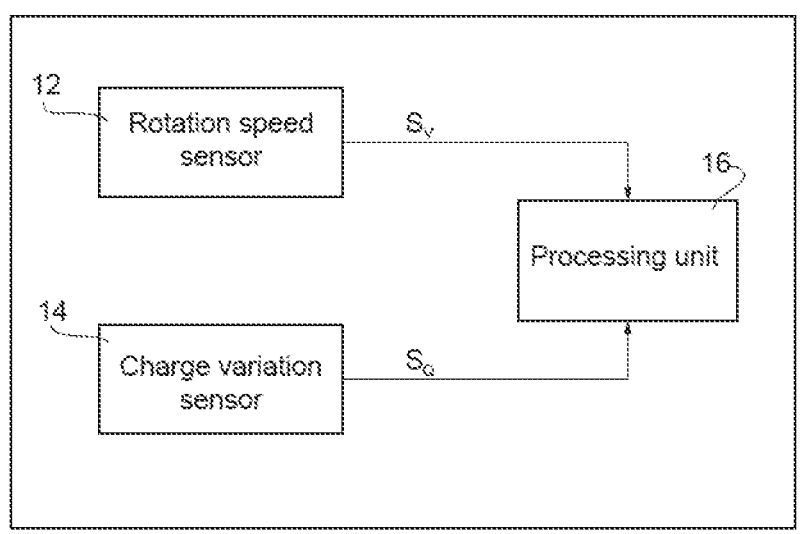
FIG. 4 is a schematic block diagram of the detection device, according to an embodiment of the present solution.

FIG. 4 illustrates, schematically, the detection device 1 according to an embodiment of the present solution, which comprises a rotation speed sensor 12, configured to provide an indication of the rotation speed of the wheel 2, to which the same detection device 1 is designed to be coupled.

In particular, in a possible embodiment, the aforementioned rotation speed sensor 12 is a semiconductor gyroscope made using MEMS (Micro Electro Mechanical System) technology, of a per se known type and not described in detail herein, which is configured to provide a rotation speed (or angular speed) signal $S_V$, expressed in degrees/sec;

an electrostatic charge variation sensor 14, configured to provide a charge variation signal $S_Q$ indicative of an electrostatic charge variation; and a processing unit 16, coupled to the rotation speed sensor 12 and to the electrostatic charge variation sensor 14 in order to receive the rotation speed signal $S_V$ and the charge variation signal $S_Q$ and configured to jointly process the aforementioned rotation speed signal $S_V$ and charge variation signal $S_Q$ to detect road conditions and output information on detected road condition.

In a manner not illustrated herein, these road condition information may be sent, for example through a wireless transmission, to a management and control unit of the vehicle 3 having the detection device 1 incorporated therein, in order to perform and activate certain actions in response to the road condition detection (for example, activating suitable adjustments of one or more systems of the vehicle 3, such as a braking system, suspensions or steering).

In greater detail, the aforementioned processing unit 16 comprises for example a microcontroller, or an MLC (Machine Learning Core) processor resident in an ASIC (Application Specific Integrated Circuit) electronic circuit coupled to the rotation speed sensor 12 and to the electrostatic charge variation sensor 14 for processing the corresponding rotation speed signal $S_V$ and charge variation signal $S_Q$; the aforementioned rotation speed sensor 12, electrostatic charge variation sensor 14 and processing unit 16 may be integrated within a same package (or chip) provided with suitable elements for electrical connection to the outside.

In a possible implementation, the aforementioned chip may be coupled to a printed circuit board (not illustrated here), and a wireless communication module (also not illustrated) may be coupled to the same printed circuit board, for remote transmission, for example to the aforementioned management and control unit of the vehicle 3, of the road condition information provided by the detection device 1.

Figure 5:
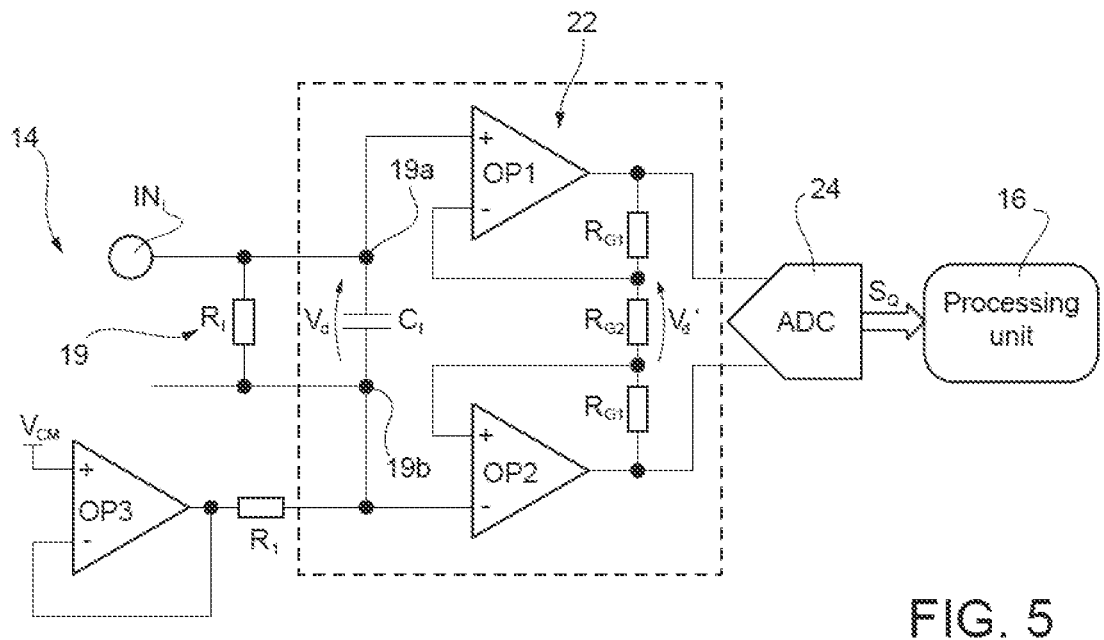
FIG. 5 illustrates a possible circuit embodiment of an electrostatic charge variation sensor of the detection device of FIG. 4.

FIG. 5 illustrates an exemplary and non-limiting embodiment of the electrostatic charge variation sensor 14, which comprises at least one input electrode IN, or detection electrode, made of metal material, possibly covered with a dielectric material layer, designed to be arranged facing or in proximity to the operating environment associated with the wheel 2, for detecting the local charge variation (and the consequent field and electric potential variation), due to the rotation of the same wheel 2 and to the contact with the road.

The detection electrode IN, in the illustrated exemplary solution, forms part of a differential input 19 of an instrumentation amplifier 22, being coupled to a corresponding first input terminal 19a.

An input capacitor $C_I$ and an input resistor $R_I$ are connected in parallel with each other between the first input terminal 19a and a second input terminal 19b of the differential input 19.

During operation, an input voltage $V_d$ across the input capacitor $C_I$ varies due to the charge redistribution in the external environment. After a transient (whose duration is given by the constant $R_I \cdot C_I$ defined by the parallel between the capacitor $C_I$ and the resistor $R_I$), the input voltage $V_d$ returns to its steady state value (so-called "steady state").

The instrumentation amplifier 22 is essentially made by two operational amplifiers OP1 and OP2, having non-inverting input terminals connected to the first and to the second input terminals 19a, 19b, respectively, and inverting terminals connected to each other through a gain resistor $R_{G2}$.

A biasing stage (buffer) OP3 biases the instrumentation amplifier 22 to a common mode voltage $V_{CM}$, through a resistor $R_1$ coupled to the second input terminal 19b.

The output terminals of the operational amplifiers OP1 and OP2 are connected to the respective inverting input terminals through a respective gain resistor $R_{G1}$; an output voltage $V_d'$ is present between the same output terminals.

As will become apparent from the examination of the circuit, the gain Ad of the instrumentation amplifier 22 is equal to $(1+2 \cdot R_1/R_2)$; therefore, the aforementioned output voltage $V_d'$ is equal to: $V_d \cdot (1+2 \cdot R_1/R_2)$.

The components of the instrumentation amplifier 22 are chosen such that the same instrumentation amplifier 22 has a reduced noise and a high impedance (for example of the order of $10^9$ Ohm) in its passband (for example comprised between 0 and 500 Hz).

The aforementioned output voltage $V_d'$ is input to an analog-to-digital converter (ADC) 24, which outputs the aforementioned charge variation signal $S_Q$ for the processing unit 16. This charge variation signal $S_Q$ may be, for example, a (16 or 24 bit) high resolution digital stream.

According to a different embodiment, having an analog-to-digital converter 24 with suitable characteristics (e.g., differential input, high input impedance, high resolution, dynamic range optimized for the quantities to be measured, low noise) the instrumentation amplifier 22 may be omitted, in this case supplying the input voltage $V_d$ directly to the input of the analog-to-digital converter 24.

In a manner not illustrated, the charge variation signal $S_Q$ may be provided to a first input of a multiplexer block, which may also receive, at at least one further input, the aforementioned rotation speed signal $S_V$ (and possibly, at further inputs, further detection signals). The output of the multiplexer block is, in this case, coupled to an input of the processing unit 16, providing the aforementioned charge variation signal and rotation speed signal $S_Q$, $S_V$ (and possibly further detection signals) for processing by the same processing unit 16.

Figure 6:
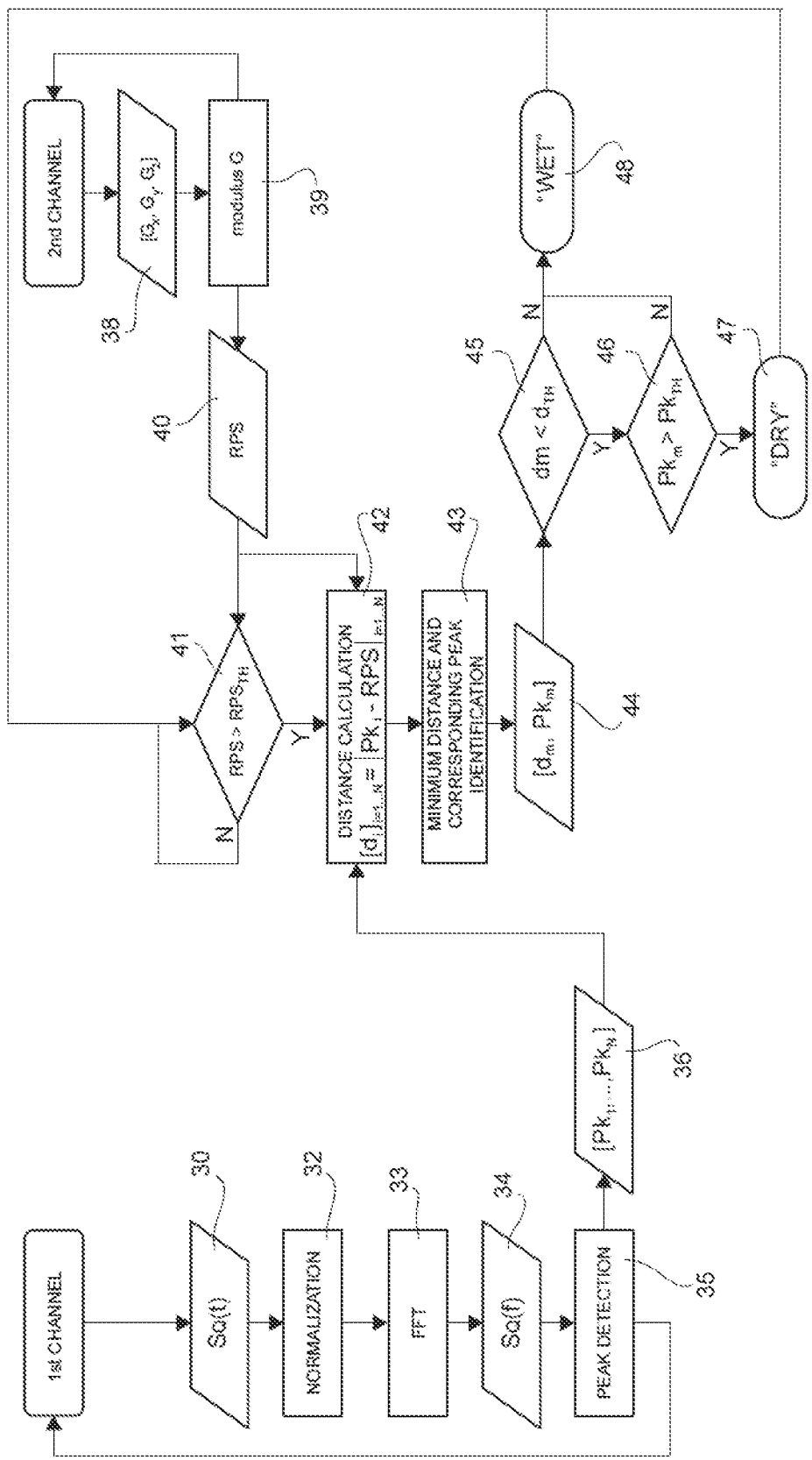
FIG. 6 is a flow chart of operations implemented by the detection device of FIG. 4, according to an embodiment of the present solution.

FIG. 6 illustrates in greater detail, through a flow chart, the joint processing operations of the charge variation and rotation speed signals $S_Q$, $S_V$ implemented by the processing unit 16, in a possible embodiment of the present solution.

As will now be described, this joint processing provides two processing channels executed in parallel and continuously over time, a first channel dedicated to the charge variation signal $S_Q$ and a second channel dedicated to the rotation speed signal $S_V$.

In detail, the processing unit 16 is initially configured to acquire, block 30, the charge variation signal $S_Q(t)$ in the time domain; in particular, corresponding samples thereof are acquired at subsequent time instants (for example, these samples are stored in an acquisition buffer which is progressively fed with and updated by the same samples).

The aforementioned charge variation signal $S_Q(t)$ may be subjected to a normalization operation, for example by removing a corresponding base value, so-called "baseline" (due for example to an environmental electrostatic charge or to an uncompensated offset of the sensor), as indicated in block 32.

The resulting signal is then provided to a frequency transform, block 33, for example through known FFT (Fast Fourier Transform) operations preceded by a windowing operation (for example through a Hann window), to obtain, as indicated in block 34, a charge variation signal $S_Q(f)$ in the frequency domain.

Then, block 35, an operation for identifying the peaks in the frequency domain in the charge variation signal $S_Q(f)$ is performed, to obtain, as indicated in block 36, a series of N identified peaks, $[Pk_1, \ldots, Pk_N]$, each at an associated frequency.

In parallel to the processing of the aforementioned charge variation signal $S_Q$, which in any case continues over time, as indicated in the same FIG. 6 the rotation speed signal $S_V$ provided by the rotation speed sensor 14 is processed in the second processing channel.

In the illustrated embodiment, this rotation speed sensor 14 is a gyroscope having three detection axes, which provides three angular speed components Gx, Gy, Gz along three detection axes.

In detail, block 38, the aforementioned angular speed components Gx, Gy, Gz are acquired and the modulus G thereof is obtained, block 39 (expressed in degrees per second).

As a function of this modulus, as indicated in block 40, the rotation speed value of the wheel 2 is obtained, expressed in rotations per second, RPS (for example, the aforementioned modulus is divided by 360 to obtain this rotation speed value, RPS).

According to an aspect of the present solution, block 41, the rotation speed value RPS is then compared to a minimum-speed threshold $RPS_{TH}$, for example corresponding to a speed of the vehicle 3 equal to 4-5 Km/h, in such a way as not to continue with the detection algorithm in case the aforementioned rotation speed value RPS is not higher than the minimum-speed threshold $RPS_{TH}$.

If, on the other hand, the aforementioned threshold condition is verified (that is, the rotation speed value RPS is higher than the minimum-speed threshold $RPS_{TH}$), the algorithm continues to block 42, where distances in the frequency domain (in absolute value) are determined between each of the previously detected peaks ($[Pk_1, \ldots, Pk_N]$) and the frequency corresponding to the aforementioned rotation speed RPS (as previously indicated, the value of this rotation speed RPS corresponds in fact to the fundamental frequency of the charge variation signal $S_Q(f)$); the aforementioned distances are indicated with ($[d_1, \ldots, d_N]$).

In the next block 43, of all the peaks the one with minimum distance $d_m$ with respect to the rotation speed value RPS is then selected, the amplitude of this selected peak being indicated with $Pk_m$, as shown in block 44.

The aforementioned minimum distance $d_m$ is then compared with a minimum-distance threshold $d_{TH}$, block 45.

In case the minimum distance $d_m$ is less than the minimum-distance threshold $d_{TH}$, a further comparison between the aforementioned selected peak amplitude $Pk_m$ and a peak-amplitude threshold $Pk_{TH}$ (whose value may for example be set in the design step or be adjustable, selectable, by an operator to adapt to various use scenarios), is performed, block 46.

In case the selected peak amplitude $Pk_m$ is greater than the peak-amplitude threshold $Pk_{TH}$, the algorithm determines the presence of a dry road condition, "dry," as indicated in block 47.

Otherwise, as indicated in block 48, in case the minimum distance $d_m$ is not less than the minimum-distance threshold dui (at the aforementioned block 45), or the selected peak amplitude $Pk_m$ is not greater than the peak-amplitude threshold $Pk_{TH}$ (at the aforementioned block 46), the algorithm determines the presence of a wet road condition, "wet," as indicated in block 48.

It should be noted that the aforementioned wet road condition is characterized by the presence of liquid, in particular an aqueous film or layer, on the surface in contact with the wheel 2, which, instead, is not present in the dry road condition.

As shown in the same FIG. 6, the processing continues over time, on the basis of the new samples of the rotation speed and charge variation signals $S_V$, $S_Q$ that are acquired.

In a possible implementation, not illustrated, the count of the time during which a certain condition persists may also be provided, in order to validate the detected condition only if this condition persists for more than a minimum time: for example, for an asphalt to be identified as dry, the system may provide for the detection of the "dry" condition, continuously, for at least five seconds (or other time interval of suitable value).

Basically, the algorithm implemented by the processing unit 16 provides, therefore, for the parallel acquisition of the rotation speed signal $S_V$ (advantageously provided by the rotation speed sensor 12, in this case a triaxial gyroscope, so as to correspond directly to the number of rotations or revolutions per second of the wheel 2, therefore to the fundamental frequency at which the pulses of the charge variation signal $S_Q$ occur) and of the same charge variation signal $S_Q$ provided by the charge variation sensor 14.

On the basis of this charge variation signal $S_Q$, a search for peaks in the spectrum $S_Q(f)$ is performed to identify the positions and amplitudes of all detected peaks.

If the aforementioned rotation speed value RPS is greater than the minimum-speed threshold $RPS_{TH}$, i.e., if the vehicle moves with a speed being greater than the minimum significant speed, the algorithm searches for the peak in the spectrum $S_Q(f)$ having minimum distance from the fundamental frequency, which corresponds to the same value RPS.

If a peak with a distance not greater, in absolute value, than the minimum-distance threshold dui is identified and it is also verified that this peak has an amplitude being greater than the peak-amplitude threshold $PK_{TH}$, then the aforementioned "dry road" condition is determined; otherwise, the aforementioned "wet road" condition is determined.

Figure 7:
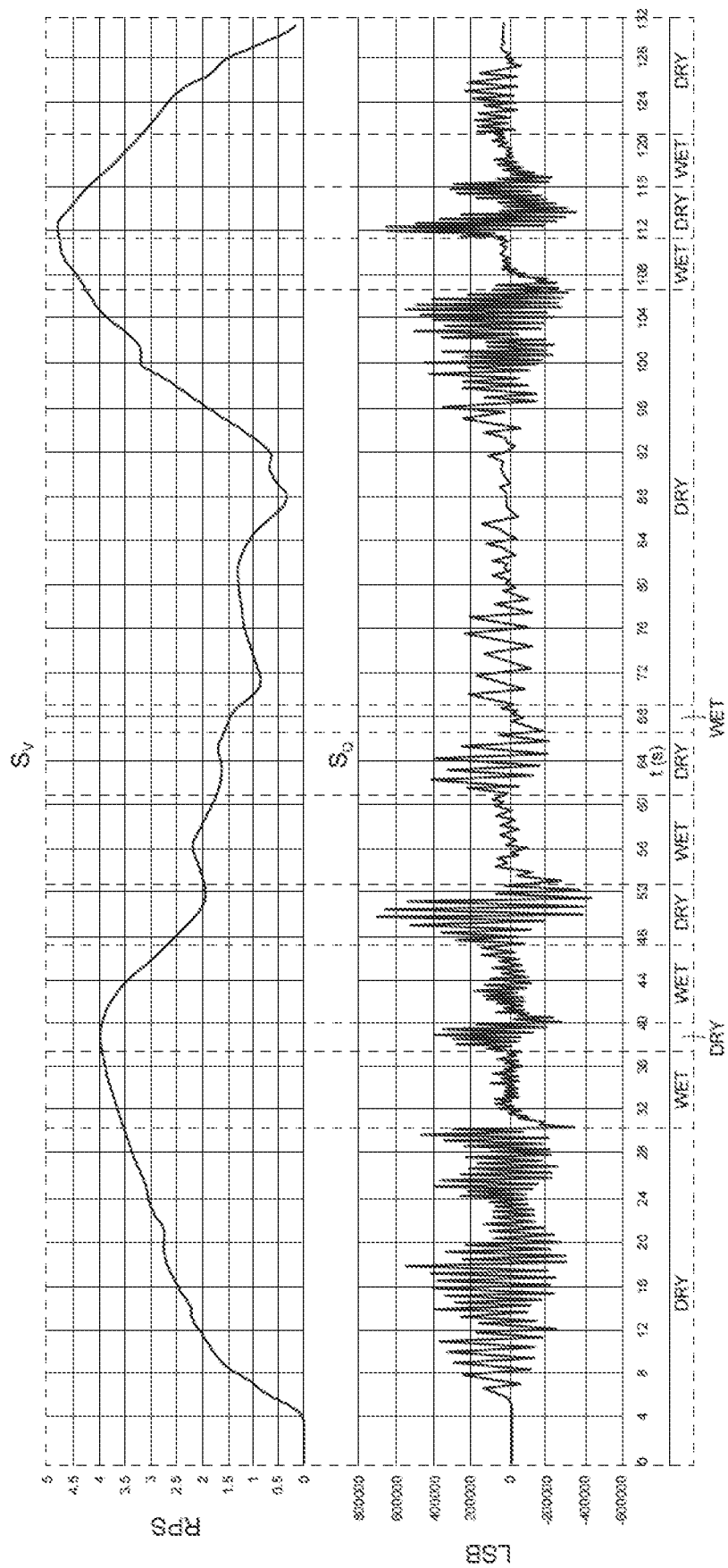
FIG. 7 shows graphs of an electrostatic charge variation signal and of a wheel rotation speed signal and the associated detection of the first and second road conditions.

FIG. 7 shows, as regards to what has just been discussed, the trends of the charge variation signal $S_Q$ and of the rotation speed signal $S_V$, as the rotation speed of the wheel 2 of the vehicle 3 varies over time, with reference to experimental tests performed by the present Applicant.

The amplitude of the charge variation signal $S_Q$ is dimensionless expressed as LSB ("Least Significant Bit"), that is the minimum digital value output from the analog-to-digital converter, which is proportional to the voltage detected at the aforementioned input electrode IN (refer again to what has been discussed with reference to FIG. 5). For example, 1 LSB may correspond to a value comprised between a few nV and a few tens of µV. The constant of proportionality (or sensitivity) depends on the gain of the amplifier, on the resolution of the analog-to-digital converter and on possible digital processing (e.g., oversampling, decimation, etc.). The LSB representation is common in the art and disregards a quantification in physical units, as the aim is typically to detect corresponding variations, with respect to a steady or baseline state.

In particular, FIG. 7 indicates the time intervals wherein the aforementioned algorithm performed by the processing unit 16 determines the presence of a "dry road" (dry) or a "wet road" (wet) condition.

Figure 8:
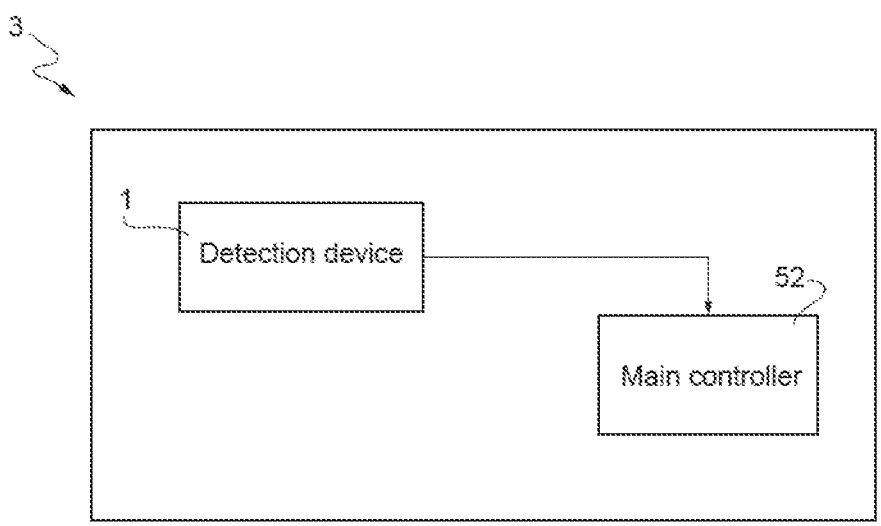
FIG. 8 is a schematic block diagram of a vehicle system in which the detection device of FIG. 4 may be used.

FIG. 8 schematically illustrates a vehicle system, wherein the vehicle 3, for example a motor car, includes at least one detection device 1 previously described, suitably coupled to at least one corresponding wheel 2.

The vehicle 3 also comprises a main controller 52 (a microcontroller, a microprocessor or a similar digital processing unit), coupled to the processing unit 16 of the detection device 1, in order to receive information relating to the detected road condition.

In the previously described embodiment, the main controller 52 receives, for example from the processing unit 16 of the detection device 1, the information of "dry road" or "wet road" condition, to activate or deactivate certain adjustments of the same vehicle 3, as previously described, for example of a corresponding braking system, of the steering or of the suspensions.

The advantages that the present solution allows to achieve are clear from the preceding description.

In any case, it is highlighted that the detection device 1:
operates correctly at all speeds of the vehicle 3 (in the speed measurement range by the rotation speed sensor, for example the gyroscope);

has a high robustness to external and unwanted factors;
has a high durability and reliability of the used sensors (the charge variation sensor 14 and the rotation speed sensor 12);
ensures an accurate and reliable classification of road conditions (distinguishing between dry and wet road conditions), allowing the number of false detections (false positives) to be removed or, in any case, strongly reduced.

The detection device 1 also has an optimized energy consumption (the consumption associated with the aforementioned rotation speed sensor 12 and charge variation sensor 14 and with the corresponding electronics is very low) and a reduced space occupation (in particular, with the possibility of integrating both the detection, rotation speed and charge variation technologies in a single package).

In this regard, and as previously indicated, the use of a MEMS gyroscope as the aforementioned rotation speed sensor 12 is particularly advantageous (in this case, in fact, the frequency of the fundamental harmonic of the charge variation signal $S_Q$ is equal to the inverse of the rotation period of the wheel 2, i.e., to the RPS value which is calculated directly from the output of the same gyroscope), according to the expression:

$$RPS=DPS/360,$$

where DPS (Degrees Per Second) corresponds to the modulus of the angular speed vector (considering the three detection axes).

Finally, variations and modifications may be applied to the present solution, without thereby departing from the scope identified by the claims.

For example, in a manner not illustrated, a plurality of the aforementioned charge variation sensors 14 might be used, possibly coupled to the different wheels 2 of the vehicle 3 and/or coupled, in a certain number, to each of these wheels 2, in order to further increase the reliability and accuracy of the determination of road conditions (for example, by averaging or processing in a suitable manner, the indications provided by the various sensors).

Similarly, the system might provide for the use of a plurality of rotation speed sensors 12, again for example coupled to each of the wheels 2 of the vehicle 3.

The aforementioned rotation speed sensor 12 might be a different sensor, for example a monoaxial or biaxial gyroscope, or a different sensor configured in any case to provide the information on the rotation speed of the wheel 2.

Furthermore, variants of the present solution might allow distinguishing, in addition to the two extreme conditions "dry" (absence of a significant amount of liquid) and "wet" (presence of a significant amount of liquid), also different and further conditions, after a suitable calibration of the detection device 1, taking into account, for example, factors such as the type of tread of the wheel 2 and the material thereof, the state of wear, the type of road surface, etc.

It is highlighted that the present solution may find advantageous application for any road vehicle, in particular a motor car, but also a motor vehicle or other kind of vehicle (bicycles, mopeds, etc.) provided with wheels in contact with the road (in a material, for example rubber, being suitable for the described electrostatic charge generation).

Furthermore, it is again highlighted that the detection device 1 may be made in a single chip that incorporates the charge variation sensor 14 (and the electronic circuitry thereof), the rotation speed sensor 12 and the processing unit 16; alternatively, the charge variation signal $S_Q$ and the rotation speed signal $S_V$ could be processed in the main controller 52 of the vehicle 3 having the detection device 1 incorporated therein (implementing in this case the aforementioned processing unit 16).

Furthermore, it is highlighted that the input electrode IN (or detection electrode) of the electrostatic charge variation sensor 14 might also be a simple conductive probe; a metal plane or path in the printed circuit board; or any conductive element that may operate as a detection electrode for being arranged facing the operating environment associated with the rotation of the wheel 2 of the vehicle 3, in order to detect the charge variation.

A road condition detection device (1), configured to be coupled to the wheel (2) of a vehicle (3) and may be summarized as including an electrostatic charge variation sensor (14), configured to provide a charge variation signal ($S_Q$) indicative of an electrostatic charge variation associated with the rotation of said wheel (2); and a processing unit (16), coupled to the electrostatic charge variation sensor (14) to receive the charge variation signal ($S_Q$) and further configured to receive a rotation speed signal ($S_V$) indicative of the rotation speed of said wheel (2), wherein said processing unit (16) is configured to jointly process said rotation speed signal ($S_V$) and charge variation signal ($S_Q$) for detecting a road condition.

Said processing unit (16) may be configured to determine one of a dry road condition and a wet road condition.

The device may further include a rotation speed sensor (12), configured to provide said rotation speed signal ($S_V$).

Said rotation speed sensor (12) may be a MEMS triaxial gyroscope; and said processing unit (16) may be configured to determine said rotation speed of the wheel (2) as a function of the modulus of an angular speed signal provided by said gyroscope.

Said charge variation sensor (12) may include at least one detection electrode (IN) configured to detect said electrostatic charge variation; a high-impedance instrumentation amplifier (22) having an input coupled to said detection electrode (IN); and an analog-to-digital converter (24) coupled to the output of said instrumentation amplifier (22) to provide said charge variation signal ($S_Q$).

Said processing unit (16), said rotation speed sensor (12) and said electrostatic charge variation sensor (14) may be integrated within a same chip.

Said processing unit (16) may be configured to: determine, in the trend in the frequency domain of said charge variation signal ($S_Q$), a peak amplitude of a fundamental frequency at said rotation speed of the wheel (2); and compare said peak amplitude with a threshold amplitude ($Pk_{TH}$) to determine one of a dry road condition and a wet road condition.

Said processing unit (16) may be configured to: determine a frequency distance between said fundamental frequency and a frequency associated with said rotation speed of the wheel (2); and compare said distance with a threshold distance ($d_{TH}$) to determine said one of a dry road condition and a wet road condition.

Said processing unit (16) may be configured to determine the dry road condition in case said distance is less than the threshold distance ($d_{TH}$) and said peak amplitude is greater than the threshold amplitude ($Pk_{TH}$); and determine the wet road condition in case said distance is not less than the threshold distance ($d_{TH}$) or said peak amplitude is not greater than the threshold amplitude ($PK_{TH}$).

Said processing unit (16) may be configured to: perform a transform in the frequency domain to obtain the charge variation signal in the frequency domain; perform a peak identification operation in the frequency domain in the charge variation signal, to obtain a series of identified peaks, each at an associated frequency; determine the frequency distances between each of the detected peaks and a frequency corresponding to the rotation speed of the wheel (2); select the peak with minimum distance ($d_m$) with respect to said frequency corresponding to the rotation speed of the wheel (2) and determine the amplitude of said selected peak as said peak amplitude of the fundamental frequency.

Said processing unit (16) may be configured to: compare said rotation speed with a minimum-speed threshold ($RPS_{TH}$); and continue the detection of said road conditions only in case said rotation speed value is higher than said minimum-speed threshold ($RPS_{TH}$).

A vehicle system, may be summarized as including a detection device (1) and a main controller (52) coupled to the processing unit (16) of the detection device (1), in order to receive information on road condition, for executing and/or activating certain actions according to said road condition.

A method for detecting road conditions for a vehicle (3) having at least one wheel (2), may be summarized as including generating, by an electrostatic charge variation sensor (14), a charge variation signal ($S_Q$) indicative of an electrostatic charge variation associated with the rotation of said wheel (2); and receiving, by a processing unit (16) coupled to the electrostatic charge variation sensor (14), the charge variation signal ($S_Q$) and a rotation speed signal ($S_V$) indicative of the rotation speed of said wheel (2), further including, by said processing unit (16), jointly processing said rotation speed signal ($S_V$) and charge variation signal ($S_Q$) to detect a road condition.

Detecting may include determining one of a dry road condition and a wet road condition.

Processing may include: determining, in the trend in the frequency domain of said charge variation signal ($S_Q$), the peak amplitude of a fundamental frequency at said rotation speed of the wheel (2); and comparing said peak amplitude with a threshold amplitude ($Pk_{TH}$) to determine one of a dry road condition and a wet road condition.

Processing may include: determining a frequency distance between said fundamental frequency and a frequency associated with said rotation speed of the wheel (2); and comparing said distance with a threshold distance ($d_{TH}$) to determine said one of a dry road condition and a wet road condition.

The method may include: determining the dry road condition in case the distance is less than said threshold distance ($d_{TH}$) and the peak amplitude is greater than said threshold amplitude ($Pk_{TH}$); and determining the wet road condition in case the distance is not less than said threshold distance ($d_{TH}$) or the peak amplitude is not greater than said threshold amplitude ($PK_{TH}$).

Processing may include: performing a transform in the frequency domain to obtain the charge variation signal in the frequency domain; performing a peak identification operation in the frequency domain in the charge variation signal, to obtain a series of identified peaks, each at an associated frequency; determining the frequency distances between each of the detected peaks and the frequency corresponding to the rotation speed of the wheel (2); selecting the peak with minimum distance ($d_m$) with respect to said rotation speed value and determine the amplitude of said selected peak as said peak amplitude of the fundamental frequency.

The method may include: comparing said rotation speed value with a minimum-speed threshold ($RPS_{TH}$); and continuing the detection of said road conditions only in case said rotation speed value is higher than a minimum-speed threshold ($RPS_{TH}$).

The method may include implementing the execution and/or activation of certain actions in said vehicle (3) according to the detection of said road conditions.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A road condition detection device, configured to be coupled to a wheel of a vehicle and to a vehicle controller, the road condition detection device comprising:
   an electrostatic charge variation sensor, which, in operation, provides a charge variation signal indicative of an electrostatic charge variation associated with rotation of the wheel; and
   processing circuitry, coupled to the electrostatic charge variation sensor, wherein the processing circuitry, in operation, receives the charge variation signal, and receives a rotation speed signal indicative of the rotation speed of the wheel,
   wherein the processing circuitry, in operation, jointly processes the rotation speed signal and the charge variation signal to detect a road condition between a wet condition and a dry condition based on an amplitude of the charge variation signal and on the rotation speed signal, wherein the processing circuitry, in operation:
   determines, in a trend in a frequency domain of the charge variation signal, a peak amplitude of a fundamental frequency at the rotation speed of the wheel;
   compares the peak amplitude with a threshold amplitude to determine one of the dry road condition and the wet road condition;
   determines a frequency distance between the fundamental frequency and a frequency associated with the rotational speed of the wheel;
   compares the frequency distance with a threshold distance to determine the one of the dry road condition and the wet road condition;
   determines the dry road condition in response to the frequency distance being less than the threshold distance and the peak amplitude being greater than the threshold amplitude;
   determines the wet road condition in response to the frequency distance not being less than the threshold distance or the peak amplitude not being greater than the threshold amplitude;
   generates a vehicle control signal indicative of the determined road condition; and
   provides the generated vehicle control signal to the vehicle controller to control one or more vehicle control systems coupled to the vehicle controller.

2. The device according to claim 1, comprising an analog to digital converter coupled between the electrostatic charge variation sensor and the processing circuitry, the electrostatic charge variation sensor including a first operational amplifier and a second operational amplifier coupled to respective inputs of the analog to digital converter.

3. The device according to claim 1, comprising a rotation speed sensor, which, in operation, provides the rotation speed signal.

4. The device according to claim 3, wherein the rotation speed sensor is a MEMS triaxial gyroscope; and wherein the processing circuitry, in operation, determines the rotation speed of the wheel as a function of a modulus of an angular speed signal provided by the gyroscope.

5. The device according to claim 3, wherein the charge variation sensor comprises:
   a detection electrode, which, in operation, detects electrostatic charge variation;
   a high-impedance instrumentation amplifier having an input coupled to the detection electrode; and
   an analog-to-digital converter coupled to an output of said instrumentation amplifier to provide the charge variation signal.

6. The device according to claim 3, comprising a chip that includes the processing circuitry, the rotation speed sensor and the electrostatic charge variation sensor.

7. The device according to claim 1, wherein the processing circuitry, in operation:
   performs a transform in the frequency domain to obtain the charge variation signal in the frequency domain;
   performs a peak identification operation in the frequency domain in the charge variation signal, to obtain a series of identified peaks, each at an associated frequency;
   determines frequency distances between each of the identified peaks and a frequency corresponding to the rotation speed of the wheel; and
   selects the peak with a minimum distance with respect to the frequency corresponding to the rotation speed of the wheel and determines the amplitude of the selected peak as the peak amplitude of the fundamental frequency.

8. The device according to claim 1, wherein the processing circuitry, in operation:
   compares the rotation speed with a minimum-speed threshold; and
   continues detection of road conditions in response to the rotation speed being higher than the minimum-speed threshold.

9. A vehicle system, comprising:
   a wheel;
   a detection device coupled to the wheel, the detection device including:
      a rotation sensor, which, in operation, detects a rotational speed of the wheel;
      a charge variation sensor, which, in operation, generates a charge variation signal; and
      processing circuitry coupled to the rotation sensor and to the charge variation sensor, wherein the processing circuitry, in operation, determines a wet or dry road condition based on an amplitude of the charge variation signal and the rotational speed of the wheel and generates a control signal indicative of the determined road condition; and
   a main controller coupled to the processing circuitry, wherein the main controller, in operation, receives the control signal indicative of the determined road condition and generates, in response to the received control signal, vehicle control signals to control one or more vehicle control systems coupled to the main controller, wherein the processing circuitry, in operation:
   determines, in a trend in a frequency domain of the charge variation signal, a peak amplitude of a fundamental frequency at the rotation speed of the wheel;
   compares the peak amplitude with a threshold amplitude to determine one of the dry road condition and the wet road condition;
   determines a frequency distance between the fundamental frequency and a frequency associated with the rotational speed of the wheel;
   compares the frequency distance with a threshold distance to determine the one of the dry road condition and the wet road condition;
   determines the dry road condition in response to the frequency distance being less than the threshold distance and the peak amplitude being greater than the threshold amplitude; and
   determines the wet road condition in response to the frequency distance not being less than the threshold distance or the peak amplitude not being greater than the threshold amplitude.

10. The system of claim 9, wherein the processing circuitry, in operation, compares a rotation speed value with a minimum-speed threshold and continues to detect the road condition in response to the rotation speed value being higher than the minimum-speed threshold.

11. A method, comprising:
   generating, by an electrostatic charge variation sensor, a charge variation signal indicative of an electrostatic charge variation associated with rotation of a wheel of a vehicle; and
   receiving, by processing circuitry coupled to the electrostatic charge variation sensor, the charge variation signal and a rotation speed signal indicative of a rotation speed of the wheel;
   detecting a road condition using the processing circuitry by processing the rotation speed signal and the charge variation signal, wherein the processing comprises:
      determining, in a trend in a frequency domain of the charge variation signal, a peak amplitude of a fundamental frequency at the rotation speed of the wheel;
      comparing the peak amplitude with a threshold amplitude to determine one of a dry road condition and a wet road condition;
      determining a frequency distance between the fundamental frequency and a frequency associated with the rotational speed of the wheel;
      comparing the frequency distance with a threshold distance to determine the one of the dry road condition and the wet road condition;
      determining the dry road condition in response to the frequency distance being less than the threshold distance and the peak amplitude being greater than the threshold amplitude;
      determining the wet road condition in response to the frequency distance not being less than the threshold distance or the peak amplitude not being greater than the threshold amplitude;
   generating a signal indicative of the determined road condition; and
generating one or more vehicle control signals to control one or more vehicle control systems based on the signal indicative of the determined road condition.

12. The method according to claim 11, wherein the processing comprises:
- performing a transform in the frequency domain to obtain the charge variation signal in the frequency domain;
- performing a peak identification operation in the frequency domain in the charge variation signal, to obtain a series of identified peaks, each at an associated frequency;
- determining frequency distances between each of the identified peaks and the frequency corresponding to the rotation speed of the wheel;
- selecting a peak with a minimum distance with respect to the rotation speed value; and
- determining the amplitude of the selected peak as the peak amplitude of the fundamental frequency.

13. The method according to claim 11, wherein the generating one or more vehicle control signals to control one or more vehicle control systems comprises generating of or more vehicle control signals to control:
- a vehicle braking system;
- a vehicle steering system;
- a vehicle suspension system;
- a driver warning system; or
- combinations thereof.

14. The road condition detection device according to claim 1, wherein the one or more vehicle control systems coupled to the vehicle controller comprise:
- a vehicle braking system;
- a vehicle steering system;
- a vehicle suspension system;
- a driver warning system; or
- combinations thereof.

15. The vehicle system according to claim 9, comprising:
a vehicle braking system coupled to the main controller, wherein the main controller, in operation, controls the vehicle braking system based on the received control signal indicative of the determined road condition.

16. The vehicle system according to claim 9, comprising:
a vehicle steering system coupled to the main controller, wherein the main controller, in operation, controls the vehicle steering system based on the received control signal indicative of the determined road condition.

17. The vehicle system according to claim 9, comprising:
a vehicle suspension system coupled to the main controller, wherein the main controller, in operation, controls the vehicle suspension system based on the received control signal indicative of the determined road condition.

18. The vehicle system according to claim 9, comprising:
a driver warning system coupled to the main controller, wherein the main controller, in operation, controls the driver warning system based on the received control signal indicative of the determined road condition.

* * * * *

UNITED STATES PATENT AND TRADEMARK OFFICE
CERTIFICATE OF CORRECTION

Page 1 of 1

PATENT NO. : 12,441,324 B2
APPLICATION NO. : 17/871463
DATED : October 14, 2025
INVENTOR(S) : Fabio Passaniti et al.

It is certified that error appears in the above-identified patent and that said Letters Patent is hereby corrected as shown below:

In the Claims

<u>Column 14, Claim 11, Line 58:</u>
"amplitude;" should read: --amplitude; and--.

Signed and Sealed this
Thirteenth Day of January, 2026

John A. Squires
*Director of the United States Patent and Trademark Office*